United States Patent [19]
Yamaguti et al.

[11] Patent Number: 5,834,631
[45] Date of Patent: Nov. 10, 1998

[54] LEAKAGE MEASUREMENT METHOD AND APPARATUS USING THE SAME

[75] Inventors: Makoto Yamaguti, Kariya; Masahiro Matsuyama, Chiryu, both of Japan

[73] Assignee: Denso Corporation, Japan

[21] Appl. No.: 770,653

[22] Filed: Dec. 19, 1996

[51] Int. Cl.⁶ .................................................. G01M 3/26
[52] U.S. Cl. ................................................ 73/40; 73/269
[58] Field of Search .................................. 73/40, 49.2 R, 73/262, 269, 270, 232, 49.3

[56] References Cited

U.S. PATENT DOCUMENTS

| | | | |
|---|---|---|---|
| 3,245,256 | 4/1966 | Hayward | 73/40 |
| 4,012,945 | 3/1977 | Bergstrand | 73/49.2 R |
| 4,283,945 | 8/1981 | Knoll | 73/629 |
| 4,488,429 | 12/1984 | Ito . | |
| 4,542,643 | 9/1985 | Himmelstein | 73/49.2 R |
| 5,212,979 | 5/1993 | Albrodt et al. | 73/40 X |

FOREIGN PATENT DOCUMENTS

| | | | |
|---|---|---|---|
| 73 43955 | 7/1975 | France | 73/49.2 R |
| 56-126734 | 10/1981 | Japan . | |
| 40-5256727 | 10/1993 | Japan | 73/40 |
| 8-15076 | 1/1996 | Japan . | |
| 8-43241 | 2/1996 | Japan . | |

*Primary Examiner*—Michael Brock
*Attorney, Agent, or Firm*—Cushman Darby & Cushman Intellectual Property Group of Pillsbury Madison & Sutro, LLP

[57] ABSTRACT

According to the present invention, a leakage measurement apparatus includes a volume metering device having a diaphragm which is displaced in accordance with a change in volume of the measurement medium leaked from an object and transmitted to the diaphragm. The volume of the leakage is calculated based on the change of the displaced amount of the diaphragm. In this way, the amount of leakage can be measured directly from the change in volume of the measurement medium. Further, the volume of the leakage can be measured without being affected by a change in pressure, and the accuracy of measurement can be improved.

16 Claims, 7 Drawing Sheets

LEAKAGE MEASUREMENT METHOD AND APPARATUS USING THE SAME

CROSS REFERENCE TO RELATED APPLICATIONS

This application is based on the Japanese Patent Application Nos. Hei. 6-172148 and Hei. 6-182238, the contents of which are incorporated herein by reference.

BACKGROUND OF THE INVENTION

1. Field of the Invention

The present invention relates to a leakage measurement method and a leakage measurement apparatus using the same.

2. Description of Related Art

Two known methods for measuring leakage from a product which needs to be airtight, are a pressure-drop method and a pressure differential. In the pressure-drop method, the leakage is measured from a pressure drop in a leakage measuring system where an object to be measured is placed in an airtightly sealed state after a predetermined pressure is applied to the object. In the differential pressure method, the leakage is measured from a difference in pressure between a master as a reference and the object to be measured.

However, in methods for measuring leakage by employing a variation in pressure, as described above, it is necessary to increase the variation in pressure in order to improve the accuracy of the measurement. However, a large variation in pressure may cause a change in volume of a pipe, a jig, or the like, or may cause a variation in a test pressure. Therefore, it is difficult to measure a particularly small amount of leakage with a high degree of accuracy. In JP-A-56-126734, another leakage measurement apparatus using a diaphragm, however, the amount of leakage cannot be measured directly.

Further, in order to measure the leakage with a high degree of accuracy, it is important that the test pressure be maintained at a constant value. However, when the object to be measured is set, a change in volume may be caused, and the internal pressure may vary. As a result, it is difficult to stabilize the test pressure.

SUMMARY OF THE INVENTION

The present invention has been accomplished in view of the above mentioned problems, and an object of the present invention is to provide a leakage measurement method and an apparatus using the same, capable of measuring a small amount of leakage with a high degree of accuracy.

According to an aspect of the present invention, in a leakage measurement method, a volume of leakage from an object is measured by using a volume metering device having a diaphragm which is displaced according to a change in volume applied thereto. The leakage measurement method includes the steps of applying a pressure to the object by using a measurement medium having a predetermined pressure, transmitting a leakage of said measurement medium from the object to the volume metering device such that the leakage of said measurement medium is applied to the diaphragm, measuring a displacement amount of said diaphragm, and calculating a leakage volume from the object based on the measured displacement amount of said diaphragm.

In this method, since the amount of leakage can be measured directly from the change in volume of the measurement medium, the volume of the leakage can be measured without being affected by a change in pressure, and the accuracy of measurement can be improved.

According to another aspect of the present invention, a leakage measurement apparatus, for measuring an amount of leakage from an object, includes a measurement base on which the object is mounted, a pressure applying device for pressurizing a measurement medium and applying the measurement medium having a predetermined pressure to the object, a volume metering device having a diaphragm, the volume metering device being in fluid communication with the object such that a leakage of the measurement medium from the object is transmitted to the diaphragm which is displaced in accordance with a change in a volume of the leakage, the volume metering device outputting a signal indicative of the displaced amount of the diaphragm, and a calculating unit for calculating a volume of the leakage based on the signal from the volume metering device.

Preferably, the leakage measurement apparatus may further include a stabilizer in fluid communication with the volume metering device, for suppressing an influence of external disturbance on the diaphragm of the volume metering device. Further, the stabilizer may include an airtightly sealed container having a volume which is sufficiently greater than a change in a volume, which is defined by the displaced amount of the diaphragm.

Preferably, the leakage measurement apparatus further includes a protection device disposed between the object and the volume metering device, for protecting the diaphragm by preventing the leakage of the measurement medium from transmitting to the diaphragm when the volume of the leakage of the measurement medium is greater than a predetermined value. Accordingly, the diaphragm is prevented from being damaged from the excessive amount of leakage.

More preferably, the leakage measurement apparatus further includes a pressure sensor for detecting a pressure of the leakage of the measurement medium transmitted to the diaphragm. Accordingly, inconvenience can be prevented, and the volume of leakage can be measured with a high degree of stability.

Further, the leakage measurement apparatus may include a second pressure applying device for applying a measurement medium having a predetermined checking pressure into a connection pipe between the object and said volume metering device, a closing valve for closing a communication between the second pressure applying device and the connection pipe, and a monitoring device for monitoring a change in the signal of the volume metering device when the valve is closed. In this way, a defective seal in the measurement system can be detected by monitoring the change in the volume of the measurement medium.

Other objects and features of the present invention will become more readily apparent from a better understanding of the preferred embodiments described below with reference to the following drawing figures.

DETAILED DESCRIPTION OF THE PREFERRED EMBODIMENTS

Embodiments according to the present invention will be described with reference to the drawings.

Figure 1:
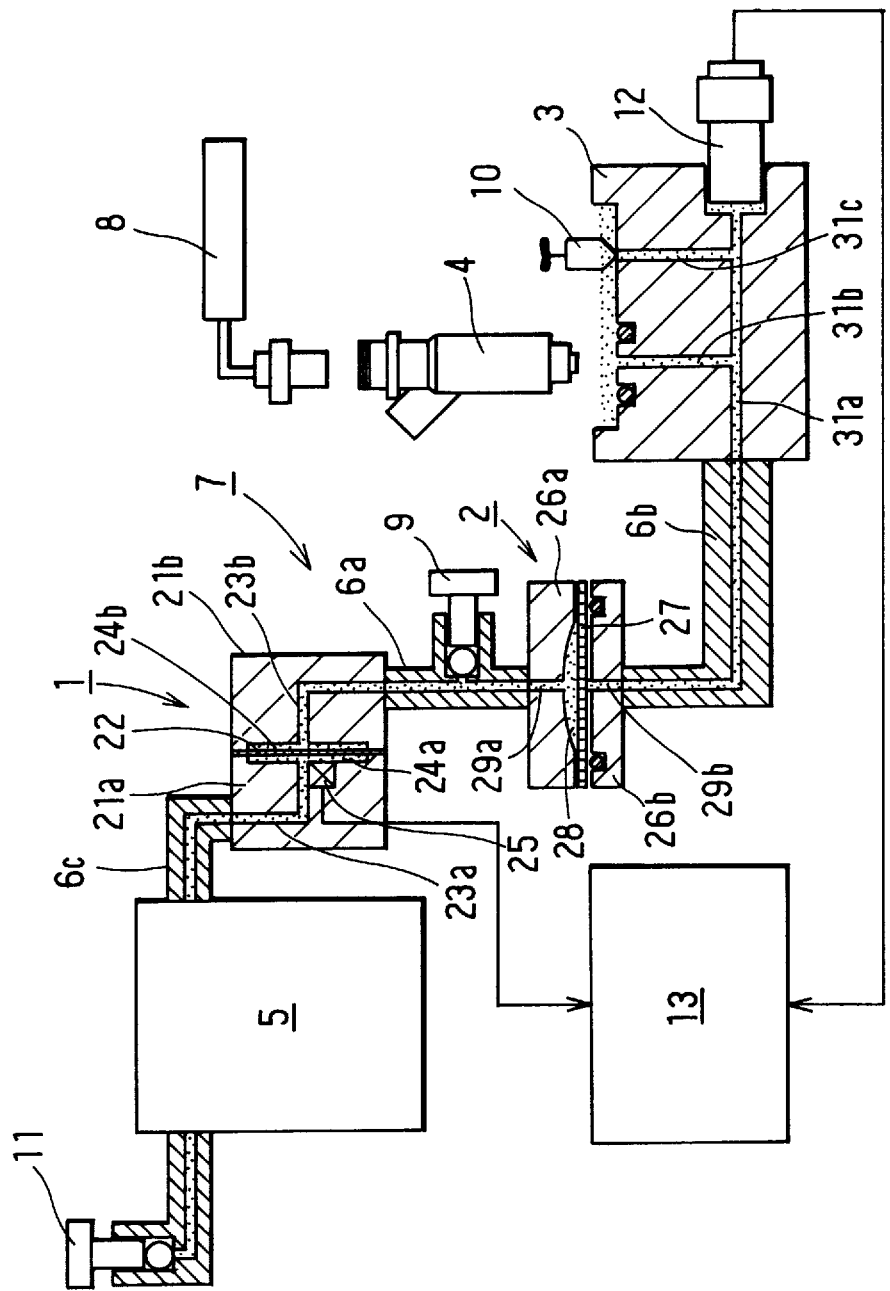
FIG. 1 is a block diagram showing a leakage measurement apparatus in a first embodiment according to the present invention.

FIG. 1 shows a leakage measurement apparatus in accordance with a first embodiment of the present invention. In FIG. 1, a displacement regulating mechanism 2 protects a diaphragm type volume meter 1 against an excessive load. A object 4 to be measured is airtightly mounted on a measurement base 3. A stabilizer 5 is connected to the diaphragm type volume meter 1.

A leakage measuring system 7 is constituted such that the measurement base 3, the displacement regulating mechanism 2, the diaphragm type volume meter 1 and the stabilizer 5 are airtightly connected by fluid paths 6b, 6a and 6c, in that order. A pressure applying apparatus 8 pressurizes and applies a leakage measurement medium to the object mounted on the measurement base 3. The measurement medium may be gas or liquid.

In the fluid path 6a connecting the diaphragm type volume meter 1 to the displacement regulating mechanism 2, an opening/closing valve 9 which communicates with the atmosphere is installed. Further, opening/closing valves 10 and 11, each of which communicates with the atmosphere, are provided on the measurement base 3 and the stabilizer 5, respectively. Also installed on the measurement base 3 is a pressure sensor 12 for sensing an internal pressure of the leakage measuring system 7. Signals output by the diaphragm type volume meter 1 and the pressure sensor 12 are input to a processing unit 13. The processing unit 13 includes a central processing unit, memory devices of a RAM, a ROM, or the like, and input/output interface units (These components are not are shown in the figure). The processing unit 13 executes a predetermined processing program to calculate an amount of leakage, and monitors an abnormality where the object 4 is mounted on the measurement base 3 and an operation abnormality of the displacement regulating mechanism 2 on the basis of the internal pressure of the leakage measuring system 7 measured by the pressure sensor 12. The processing unit further executes an interlock process when the abnormality where the object 4 is mounted or the operation abnormality of the displacement regulating mechanism 2 is detected. The pressure sensor 12 is selected such that a pressure receiving portion thereof has a minute change in volume against the change in pressure to prevent an influence on the leakage measurement.

Figure 2:
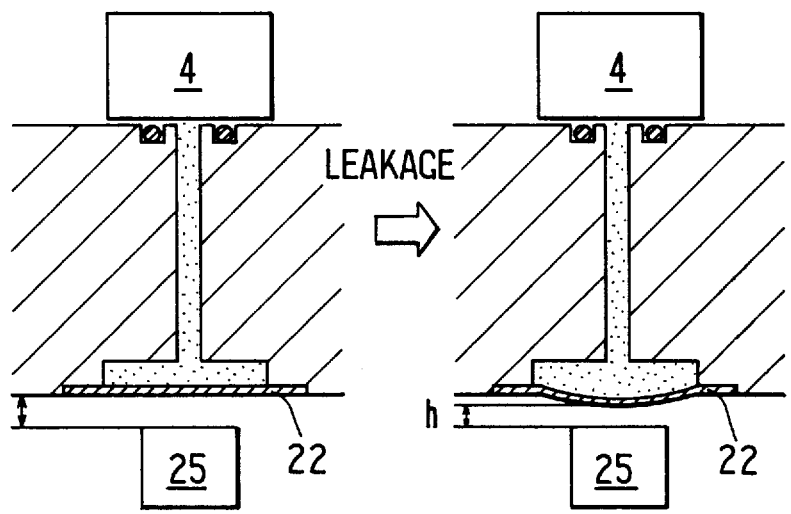
FIG. 2 is an explanatory diagram for explaining the basic principle of leakage measurement in the first embodiment.

The diaphragm type volume meter 1 is divided into bodies 21a and 21b on the left and right sides, respectively, and a diaphragm 22 spreads airtightly between the bodies 21a and 21b. The diaphragm 22 is selected so as to react sensitively to a minute change in volume transferred through fluid paths 23a and 23b. Preferably, a diaphragm may be made of a stainless steel material, e.g., SUS410, with a thickness of 0.05 mm. Concave portions 24a and 24b in which the diaphragm 22 is displaced are formed on the bodies 21a and 21b and communicate with the fluid paths 23a and 23b, respectively. When the leakage measurement medium leaks from the object 4, the diaphragm 22 is minutely displaced in accordance with the change in volume of the leakage measurement. As shown in FIG. 2, an amount of the minute displacement of the diaphragm 22 is measured by a displacement sensor 25 generally used as a pressure sensor for detecting a change in reactance and a signal from the displacement sensor 25 is input to the processing unit 13.

Figure 4:
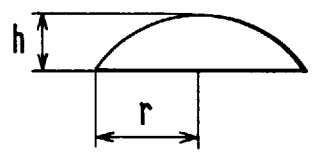
FIG. 4 is a schematic view showing a displacement amount h and a radius r of the diaphragm.

A relationship between the displacement amount h (mm) of the diaphragm 22, the change in volume V (mm$^3$) of the leakage measurement medium is expressed by the following formula (1):

$$V=\pi h(3r^2+h^2)/6 \tag{1}$$

wherein r (mm) is a radius of the diaphragm 22, as shown in FIG. 4.

Figure 3:
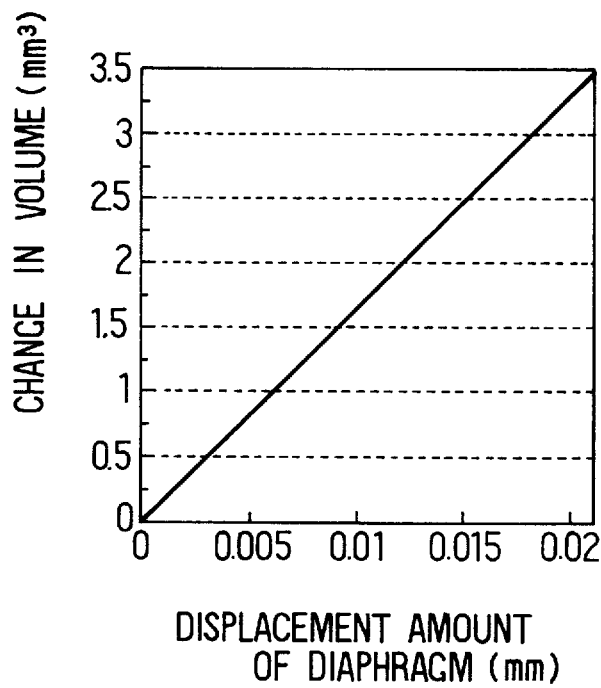
FIG. 3 is a graph showing a relationship between a displacement amount of a diaphragm and a change in volume.

Here, by setting the radius r of the diaphragm 22 at a proper value, the relationship between the displacement h and the change in volume V can be made linearly proportional as shown in FIG. 3. As a result, since it is not necessary to perform a complex correction in order to calculate the change in volume V of the leakage measurement medium, the amount of leakage can be measured with a simple assembly.

In the case of excessive leakage from the object 4, or the like, the displacement regulating mechanism 2 protects the diaphragm 22 by preventing an excessive load from being applied to the diaphragm type volume meter 1. The displacement regulating mechanism 2 is divided into two bodies 26a and 26b on the upper side and the lower side, respectively. A protection film 27 spreads airtightly between the bodies 26a and 26b. A concave portion 28a having a half spherical shape is formed on the upper side of the body 26a. In an regular leakage measurement, the protection film 27 is displaced by a distance depending upon the volume of leakage. In the case of excessive leakage, however, the protection film 27 closely contacts with a surface of the concave portion 28a to prevent the protection film 27 from being further displaced. Accordingly, the change in volume of the diaphragm 22 is set within an allowable range, so that the diaphragm 22 is protected from being damaged. Fluid paths 29a and 29b are formed in the bodies 26a and 26b and communicate with the fluid paths 6a and 6b, respectively.

In this case, preferably, the protection film 27 may be made of a metallic material, such as stainless steel SUS304, with a thickness of 0.005 mm.

When the leakage measurement medium is liquid, the displacement regulating mechanism 2 may be installed horizontally at a position higher than the position on which the object 4 is mounted. In such an arrangement, the protection film 27 is horizontally positioned in parallel with the body 26b, and the original position can be always maintained.

A fluid path 31a communicating with the fluid path 6b and fluid paths 31b and 31c each communicating with the fluid path 31a in a perpendicular direction to the fluid path 31a are formed in the measurement base 3. In the fluid path 31a, there is provided the pressure sensor 12 for measuring the internal pressure of the leakage measuring system 7 and supplying a signal indicative of the measured internal pressure to the processing unit 13. The fluid path 31b communicates with the object 4 is airtightly mounted on the base 3. Further, the hydraulic path 31c communicates with the opening/closing valve 10 communicating with to the atmosphere.

The stabilizer 5 suppresses an influence of external disturbances such as fluctuations in an atmospheric pressure and environmental convection on the diaphragm 22 in the diaphragm type volume meter 1. The stabilizer 5 includes an airtightly sealed container having a predetermined volume so as not to be affected by a change in pressure, and is airtightly connected to the fluid path 23a in the diaphragm type volume meter 1 through the fluid path 6c. In this case, by making the volume of the container of the stabilizer 5 larger sufficiently as compared with the change in displacement of the diaphragm 22, a change in pressure in the container of the stabilizer 5 with the change in the displacement of the diaphragm 22 becomes small and can be ignored.

When the diaphragm 22 in the diaphragm type volume meter 1 is displaced by a predetermined value or more in either direction due to thermal expansion of the leakage measurement medium filled in the leakage measuring system 7, one of the opening/closing valves 9 and 11 installed in the fluid path 6a and the stabilizer 5, respectively, is opened, such that the leakage measuring system 7 communicates with the atmosphere. When one of the opening/closing valves 9 and 11 is opened, the diaphragm 22 is returned to the original position thereof.

Next, an operation of the leakage measurement apparatus having the above constitution will be described in a case where the volume of leakage from a fuel injecting valve used as the object 4 is measured. The object 4 is airtightly mounted on the measurement base 3, and the pressure applying apparatus 8 pressurizes the leakage measurement medium to a predetermined pressure and supplies to the object 4. If a minute leakage occurs in the object 4, the leakage is transmitted to the protection film 27 through the fluid paths 31b and 6b and further transmitted to the diaphragm 22 via the protection film 27. The diaphragm 22 is displaced by the change in volume in accordance with the volume of leakage transmitted thereto. The change in volume which has been measured by the displacement sensor 25 as a displacement of the diaphragm 22 is output to the processing unit 13. The processing unit 13 calculates the amount of leakage from the formula (1) expressing the relationship between the displacement h (mm) of the diaphragm 22 and the change in volume V (mm$^3$) shown in FIG. 3.

As described above, in the leakage measurement method and the leakage measurement apparatus according to this embodiment detects the change in volume of the leakage measurement medium filled in the airtightly sealed leakage measuring system 7 instead of detecting a change in pressure of the leakage measurement medium. As a result, the amount of leakage can be directly measured by measuring the displacement of the extremely flexible diaphragm 22 which sensitively reacts even to a minute change in volume. In addition, by employing the extremely flexible diaphragm 22, the displacement can be made small enough so as to ignore a change in pressure caused by means of other factors in the leakage measuring system 7 during the measurement time. As a result, the amount of leakage can be measured with a high degree of accuracy without being affected by the change in pressure.

The displacement regulating mechanism 2 for preventing the diaphragm 22 from being displaced by a predetermined distance or more is provided to protect the diaphragm 22 from being damaged. In addition, the internal pressure of the leakage measuring system 7 is measured by the pressure sensor 12 in order to monitor an abnormal operation of the displacement regulating mechanism 2. As a result, a problem caused by the abnormal operation can be avoided.

Figure 5:
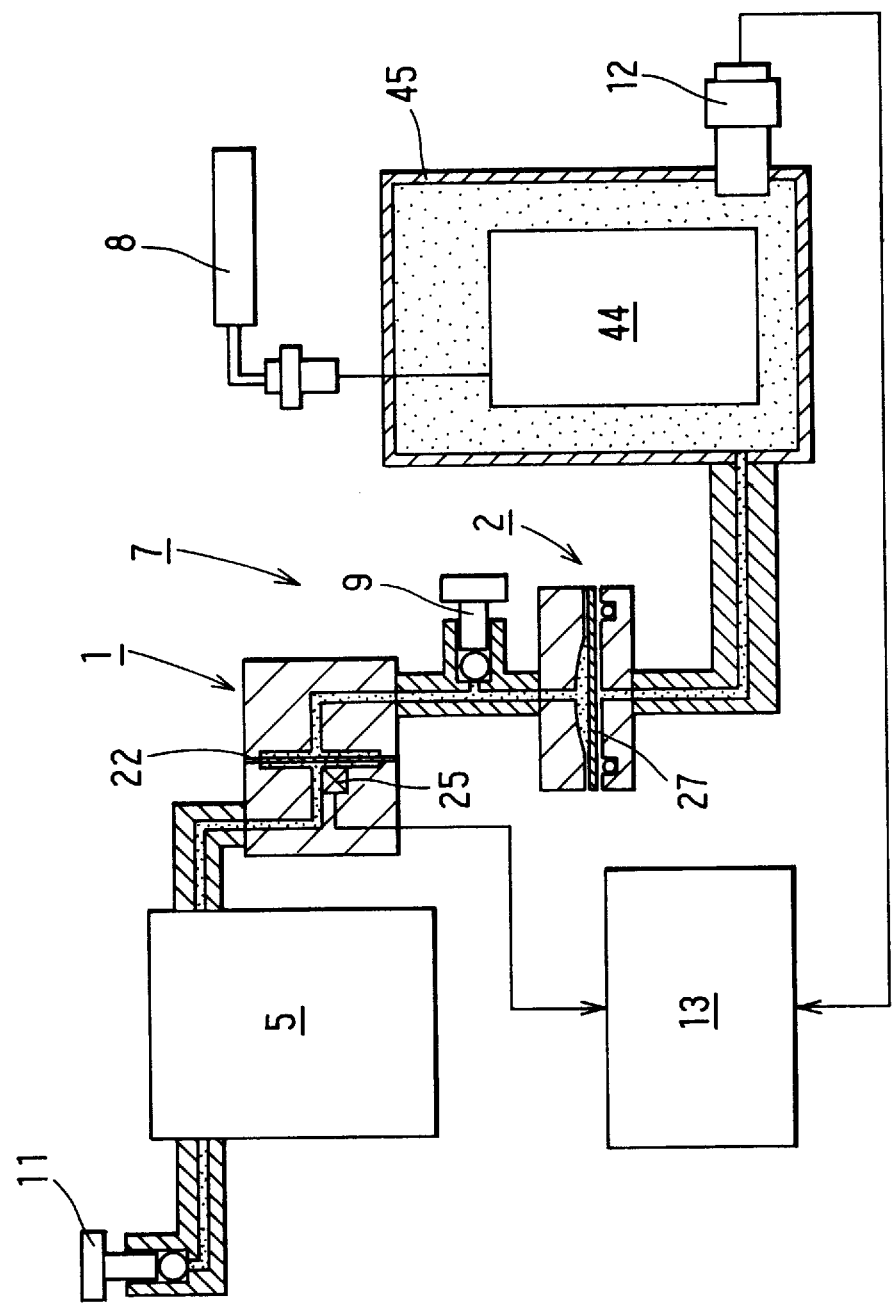
FIG. 5 is a block diagram showing a modification of the first embodiment.

When the leakage location of the object to be measured cannot be identified, the volume of leakage can be measured by a leakage measurement apparatus having a construction shown in FIG. 5. The object 44 to be measured is disposed within an airtightly sealed container 45. When the pressure applying apparatus 8 applies pressure to the object 44, the change in volume according to the volume of the leakage from the object 45 occurs in the container 45. The change in volume is transmitted to the volume meter 1 through the fluid path 6b, the displacement regulating mechanism 2, and the fluid path 6b, and the volume of the leakage can be measured.

Next, a second embodiment will be described with reference to FIG. 6. The descriptions of the constructions of parts or components as well as operations according to the second embodiment which are identical or equivalent to those in the first embodiment are omitted.

Figure 6:
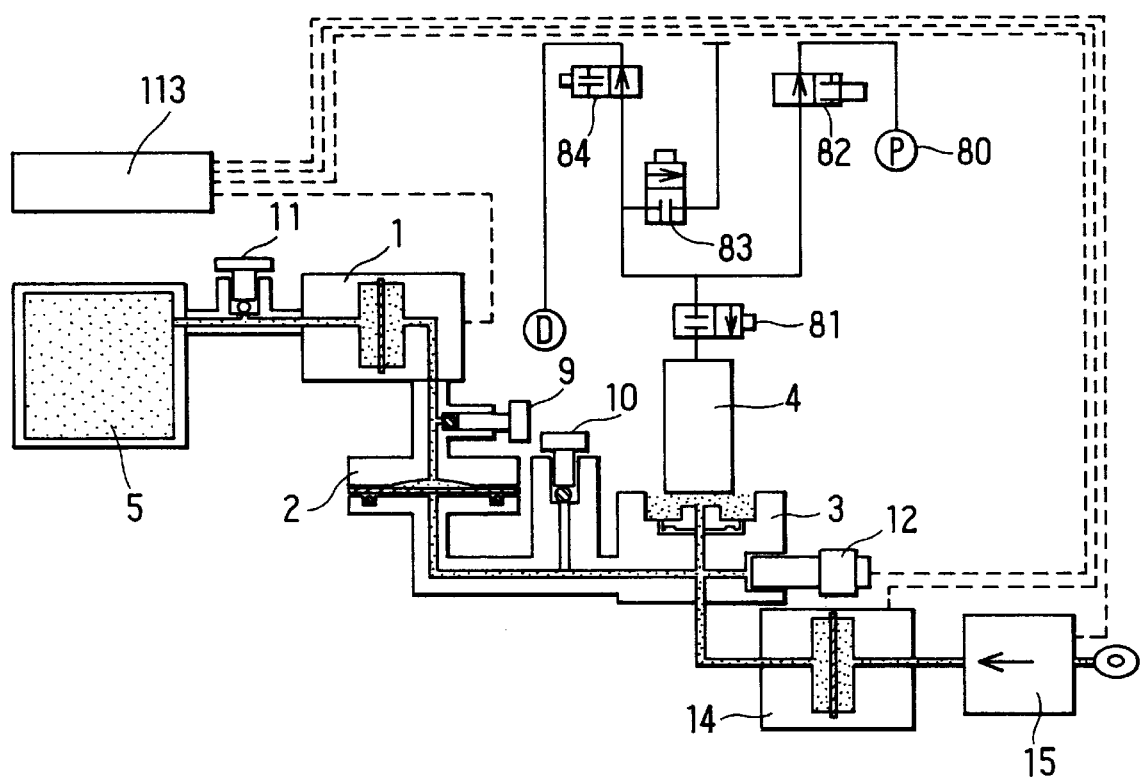
FIG. 6 is a block diagram showing a leakage measurement apparatus in a second embodiment according to the present invention.

In FIG. 6, a diaphragm type volume meter 1 includes a flexible diaphragm. The diaphragm is displaced in accordance with the volume of leakage from an object 4 to be measured. The detailed construction of the diaphragm type volume meter 1 is the same as that of the first embodiment.

An adjustment mechanism 14 has the same structure as the diaphragm type volume meter 1 but has an extremely hard diaphragm instead of the flexible diaphragm. The hard diaphragm is displaced by a predetermined distance or by a predetermined time rate with an electro-pneumatic converter 15, so as to introduce the measurement medium having a predetermined volume into a leakage measuring system, which is equivalent to the volume of the measurement medium leaked from the object 4. The adjustment mechanism 14 is incorporated in the measurement apparatus in a steady state all the time. By setting the diaphragm of the adjustment mechanism 14 to be sufficiently harder than the diaphragm of the diaphragm type volume meter 1, an error caused by the displacement of the hard diaphragm of the adjustment mechanism 14 can be ignored. By performing such an operation equivalent to the leakage with the adjustment mechanism 14 and the electro-pneumatic converter 15 at certain intervals, the measurement accuracy of the measurement apparatus can be maintained and controlled with ease.

A processing unit 113 converts an analog signal from the diaphragm type volume meter 1 into a digital signal and executes the process to calculate the volume of leakage. In addition, the processing unit 113 also controls the electro-pneumatic converter 15 based on an output signal of the D/A conversion, and executes an interlock process based on a signal from a pressure sensor 12.

A leakage measurement medium supplying apparatus 80 applies a predetermined pressure to the object 4, and a leakage measurement medium supplying circuit is controlled by valves 81–84. The valve 81 connects the leakage measurement medium supplying apparatus 80 to the object 4, and the valve 82 controls to supply the leakage measurement medium. The valve 83 applies a liquid-column pressure at a seal checking. The valve 84 circulates the leakage measurement medium when no leakage measurement is performed.

Next, an overall operation of the this embodiment in a case where a liquid is employed as the leakage measurement medium will be described. Before (or after) the leakage measurement, in a state where the object 4 is set on the measurement base 3, the seal checking is performed to diagnose whether or not there is a leakage of the measurement apparatus itself including the state where the object 4 is set. In this case, it can be also diagnosed whether or not the object 4 is airtightly set. More specifically, in the state where the valves 82 and 84 are closed and the valves 81 and 83 are opened, when a seat portion of the object 4 which has a valve opening/closing function is opened, a preset liquid-column pressure in the measurement apparatus is applied. Then, the seat portion is airtightly closed and a change in an output value of the volume meter is observed. If a leakage generates at that time, the volume meter indicates a negative change or a drop, because the output value corresponding to the liquid-column pressure can not be maintained. In this way, the seal checking can be performed. As a result, a stable test pressure can be provided.

Next, a leakage measurement is performed. In the state where the valve 83 is closed and the valve 82 is opened, a predetermined pressure is applied to the leakage measurement object 4 by means of the leakage measurement medium supplying apparatus 80. At that time, the opening/closing valves 9, 10 and 11 are closed. If a leakage from the object 4 generates, the diaphragm of the diaphragm type volume meter 1 is displaced corresponding to the volume of leakage which is transmitted to the diaphragm via a displacement regulating mechanism 2. In this case, a signal output by the diaphragm type volume meter 1 is supplied to the processing unit 113 and converted into the volume of the leakage. The method for converting the output signal into the volume of the leakage may employ the formula (1) in the first embodiment or an equation calibrated by a master of already known amounts of the leakage. According to the operations as described above, it is possible to measure a minute amount of the leakage with a high degree of reliability and with a high degree of accuracy by employing the self-diagnosis for the seal checking.

Next, a master check for the daily maintenance and management of the measurement apparatus will be described. An object having no leakage is set on the measurement base 3. In the state where the opening/closing valves 9, 10 and 11 are closed, the electro-pneumatic converter 15 which is controlled by the processing unit 13 applies a pressure to one side of the adjustment mechanism 14. A relationship between the pressure applied to the adjustment mechanism 14 and the volume of leakage is calibrated in advance. The diaphragm of the adjustment mechanism 14 is displaced, and the leakage measurement medium having the volume equivalent to the volume of the leakage from the object 4 into the measurement system is introduced by the electro-pneumatic converter 15. By comparing the measurement value obtained from the diaphragm type volume meter 1 with the volume of the refilled leakage measurement medium (the volume of leakage) with the adjustment mechanism 14, the measurement accuracy can be guaranteed.

In the second embodiment, as mentioned in the first embodiment, the leakage from the product (the object 4 to be measured) is measured as a change in volume in the leakage measuring system instead of a change in pressure. Further, by employing the extremely flexible diaphragm in the diaphragm type volume meter, the displacement of the diaphragm can be made small enough to ignore the change in pressure during the measurement time can be ignored. In this way, a leakage measurement method which is not affected by the change in pressure can be obtained.

In this embodiment, a sensor having the same structure as the diaphragm type volume meter is used as an adjustment mechanism which is incorporated in the facility all the time to serve as a maintenance/management master in combination with the electro-pneumatic converter. Accordingly, it becomes possible to measure a leakage with a high degree of accuracy.

Figure 7:
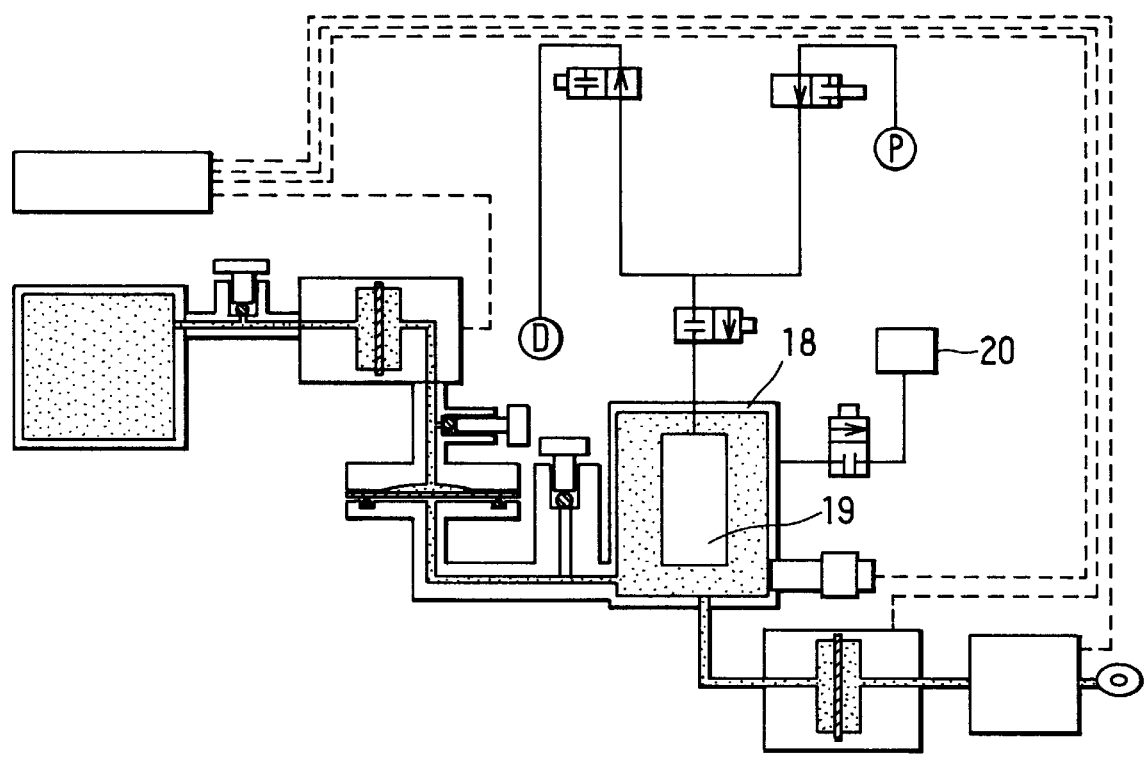
FIG. 7 is a block diagram showing a modification of the second embodiment.

When the leakage location cannot be identified, the amount of leakage can be measured by a leakage measurement apparatus having a construction shown in FIG. 7. An object 19 to be measured is disposed in an airtightly sealed container 18 communicating with a pressure applying apparatus. In this arrangement, leakage from the object 19 is all transmitted to the volume meter 1 capable of measuring the amount of the leakage. Seal checking can be performed in the same way as the second embodiment by employing an apparatus 20 for applying a seal checking pressure. As a result, a stable test pressure can be provided.

Figure 9:
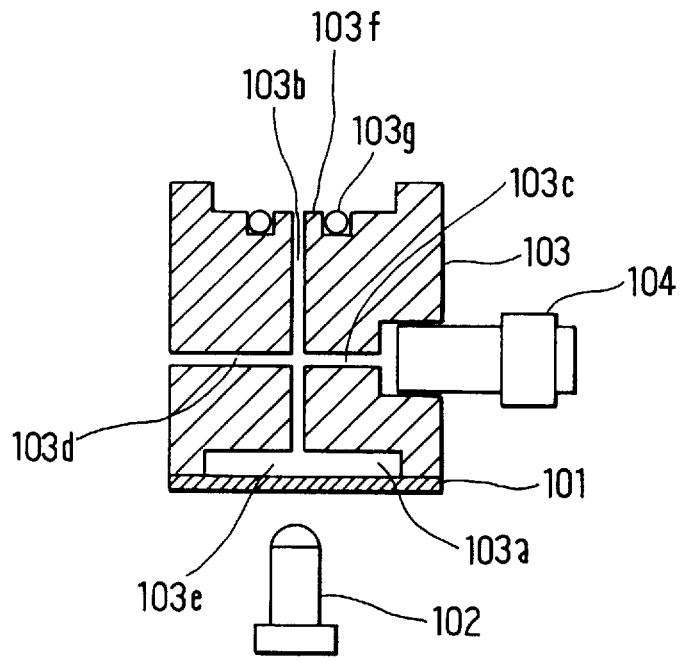
FIG. 9 is a diagram showing a main portion of the leakage measurement apparatus in the third embodiment.
Figure 10:
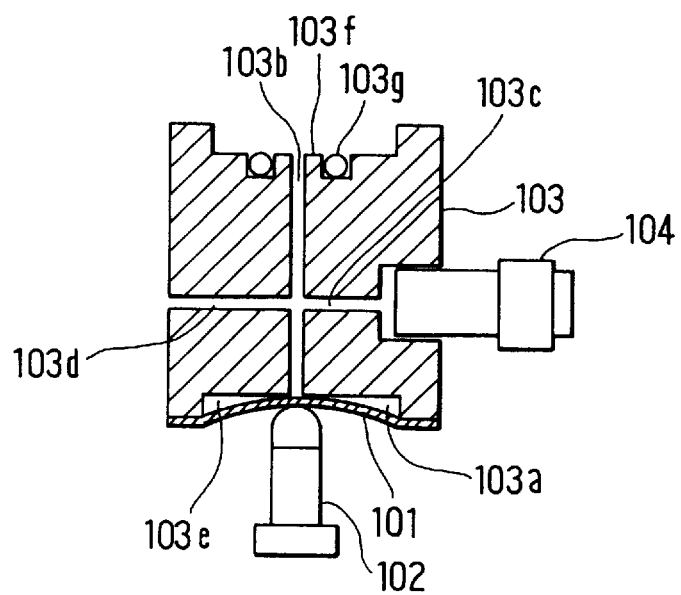
FIG. 10 is another diagram showing a main portion of the leakage measurement apparatus in the third embodiment

Next, a third embodiment of the present invention will be described with reference to FIGS. 8 to 10. Descriptions of the same effects and features as those in the first embodiment are omitted.

Figure 8:
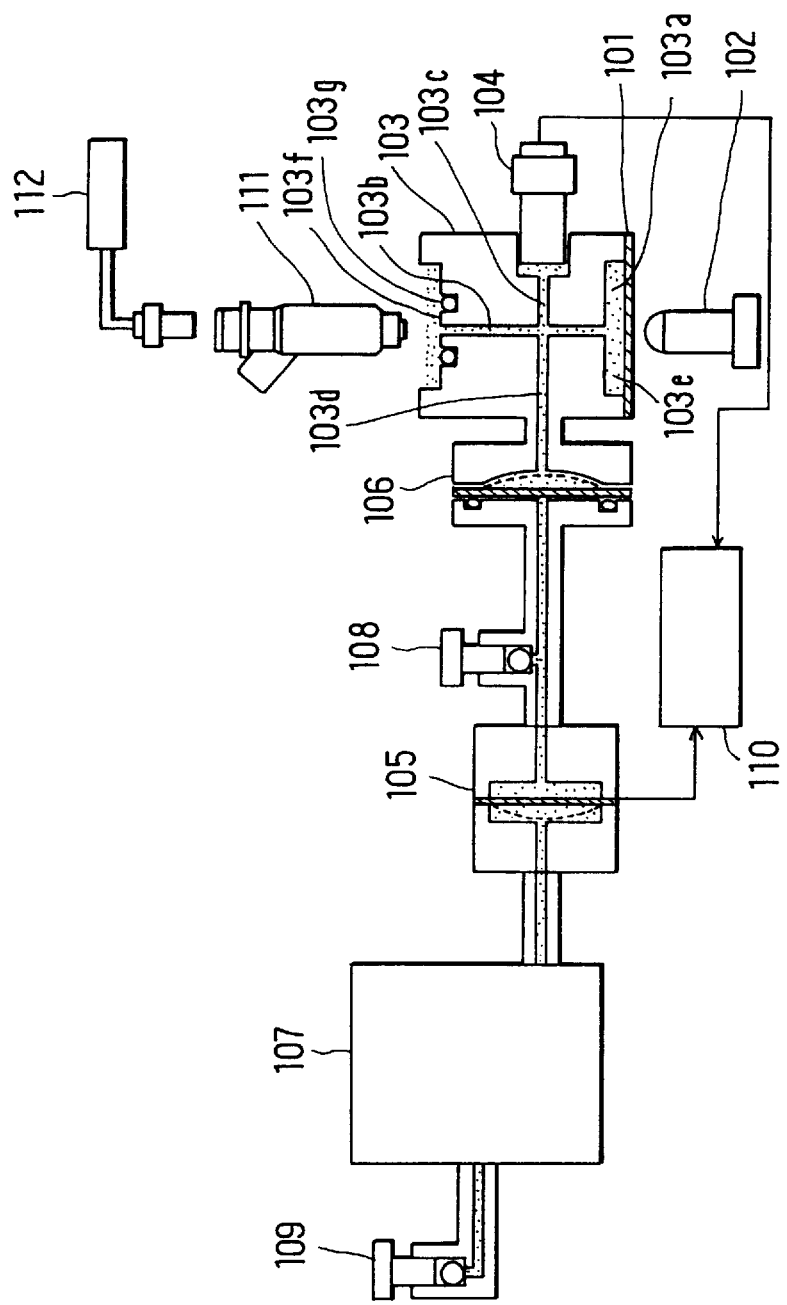
FIG. 8 is a block diagram showing a leakage measurement apparatus in a third embodiment.

In FIG. 8, an internal pressure regulating diaphragm 101 includes a hard diaphragm. The internal pressure regulating diaphragm 101 regulates the volume of an internal pressure regulation space 103e enclosed by a concave portion 103a and the internal pressure regulating diaphragm 101 so that the volume of a leakage measuring system is regulated. The internal pressure regulating diaphragm 101 is closely attached to a measurement base 103.

The internal pressure regulating diaphragm 101 is mechanically operated by an internal pressure regulating diaphragm displacement apparatus 102 (described later). The volume of the leakage measuring system is adjusted by a bending amount of the internal pressure regulating diaphragm 101. The internal pressure regulating diaphragm displacement apparatus 102 is a micrometer in this embodiment.

The measurement base 103 includes the concave portion 103a, a first connection path 103b, a second connection path 103c, a third connection path 103d, the internal pressure regulation space 103e, an end 103f, and a seal material (O-ring) 103g.

A pressure sensor 104 monitors a pressure in the leakage measuring system. A diaphragm type volume meter 105 measures the amount of leakage and outputs a value indicative of the volume of the leakage. A displacement regulating mechanism 106 protects the diaphragm type volume meter 105 against large leakage.

A stabilizer 107 protects the diaphragm type volume meter 105 from disturbances such as environmental convection and a change in atmospheric pressure. Opening/closing valves 108 and 109 open or close the communication with the atmosphere. A processing unit 110 calculates a volume of the leakage from the value output from the diaphragm type volume meter 105 and instructs an operation of the micrometer 102 as the internal pressure regulating diaphragm displacement apparatus, in accordance with the output of the pressure sensor 104. A pressure applying apparatus 112 applies a pressure to an object 111 to be measured.

Next, an operation of the leakage measurement apparatus according to the third embodiment will be described.

When the object 111 is mounted on the leakage measurement base 103 shown in FIG. 8, a volume in the leakage measuring system changes by a deformation of the seal material O-ring g, and the internal pressure of the leakage measuring system rises. In order to prevent the internal pressure from rising, before the object 111 is set, the micrometer 102 is displaced in a direction where the internal pressure regulating diaphragm 101 is set at an initial position so as to reduce the volume of the internal pressure regulation space 103e as shown in FIG. 10. In this state, the pressure sensor 104 indicates the pressure of the atmosphere.

Next, the object 111 is set on the end 103f of the base 103. While monitoring the increase in internal pressure by using the pressure sensor 104, the position of the internal pressure regulating diaphragm 101 is returned in a direction where the volume of the internal pressure regulation space 103e is increased, by using the micrometer 102 so as to control the increase in internal pressure to zero. As a result, a measurement error (a variation in test pressure) caused by an increase in internal pressure which may occur when the object 111 is set can be eliminated.

Then, a pressure is applied to the object 111 using the pressure applying apparatus 112, while the opening/closing valves 108 and 109 are closed. As a result, the volume of the leakage can be measured with a high degree of accuracy.

In addition, in order to employ a fail-safe function for preventing a defective product from being determined as a good one, the internal pressure regulating diaphragm 101 is displaced in the direction where the volume of the internal pressure regulation space 103e is increased, by using the micrometer 102 so as to adjust the internal pressure to a negative value. In this way, a leakage from a seal portion of the object 111, a jig, or a pipe system have the same direction as the leakage from the object 111, and the fail-safe function where the defective product can be always determined as "the leakage occurs" can be obtained.

Measuring operations are described more specifically with reference to FIG. 8. The opening/closing valves 108 and 109 are opened to the atmosphere. Next, the internal pressure regulating diaphragm 101 is displaced in a direction where the volume of the concave portion 103a is reduced by a predetermined distance with the micrometer 102 so as to decrease the volume of the leakage measuring system.

Then, the leakage measurement object 111 is set on the base 103. The increase in the internal pressure at that time is reduced to zero, while monitoring the output of the pressure sensor 104, by returning the internal pressure regulating diaphragm 101 with the micrometer 102. Then, the opening/closing valves 108 and 109 are closed, and the pressure applying apparatus 112 applies a pressure to the object 111. As a result, the volume of the leakage can be measured with a high degree of accuracy.

In addition, in order to employ the fail-safe function, the internal pressure regulating diaphragm 101 is further displaced in a direction where the pressure of the internal pressure regulation space 103e is set to be negative, by using the micrometer 102. In this way, the internal pressure of the leakage measuring system is set to be negative by a predetermined value. At that time, a protection film of a displacement regulating mechanism 106 is displaced so as not to contact with a concave portion having a spherical surface, as shown by a chain line in FIG. 8.

In this state, the opening/closing valves 108 and 109 are airtightly closed, and the leakage is measured. If the leakage from the object 111 generates, the diaphragm of the diaphragm type volume meter 105 is displaced as shown by the chain line in FIG. 8, and the diaphragm type volume meter 105 outputs the value according to the displaced amount of the diaphragm. The value is converted into the volume of the leakage by the processing unit 110.

In addition, when the leakage from the jig or the pipe system generates, fluid enters from the outside, because the internal pressure is negative. The displacement of the diaphragm of the diaphragm type volume meter 105 has the same direction as the leakage from the leakage measurement object 111, and the leakage from the jig, the pipe system or the like is added to the leakage from the leakage measurement object 111 to satisfy the fail-safe function where the defective product is not determined as a good one.

According to the present invention described above, the internal volume of the leakage measuring system can be adjusted without causing the leakage, and by eliminating the variation in test pressure caused by the change in internal pressure which may occur when the object is set, the volume of the leakage be measured with a high degree of accuracy.

In addition, when the internal pressure of the leakage measuring system is set at a negative value, it is possible to provide a highly reliable leakage measuring apparatus and a leakage measurement method, having a fail-safe function for preventing a defective object from being determined as a good one even in the case where the measurement apparatus breaks down.

In the leakage measurement method according to this embodiment, the leakage is measured on the leaking side, however, the leakage may be measured on the pressure supplying side as well.

That is, the internal pressure regulating diaphragm 101 and the micrometer 102 shown in FIG. 8 are incorporated on the pressure applying side.

After a predetermined pressure is applied to the object, the measurement circuit is airtightly closed by a valve for example. At that time, the internal pressure may be affected by the operation of the valve. However, in this case, the leakage is measured on the pressure applying side, and therefore, the variation in internal pressure cannot affect on the measurement.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A leakage measurement method for measuring a volume of leakage from an object to a be measured, by using a volume metering device having a diaphragm which is displaced according to a volume applied thereto, said leakage measurement method comprising steps of:

applying a pressure to said object by using a measurement medium having a predetermined pressure;

transmitting a leakage of said measurement medium from said object to said volume metering device such that said leakage of said measurement medium is applied to said diaphragm;

measuring a displacement amount of said diaphragm; and calculating a leakage volume from said object based on said measured displacement amount of said diaphragm; and further comprising a step for preventing said leakage of said measurement medium from being transmitting to said volume metering device when a volume of said leakage of said measurement medium is equal to a predetermined value or more.

2. A leakage measurement method according to claim 1, wherein said leakage volume from said object is calculated by using the following formula:

$$V=\pi h(3r^2+h^2)/6$$

where, V (mm³) is a change in said leakage volume of said measurement medium, r (mm) is a radius of said diaphragm, and h (mm) is a displaced amount of said diaphragm.

3. A leakage measurement method according to claim 1, wherein said measurement medium is a liquid.

4. A leakage measurement method according to claim 1, further comprising:

a step for suppressing an influence of external disturbance on said volume metering device.

5. A leakage measurement method according to claim 1, further comprising:

a step for detecting a pressure of said leakage of said measurement medium.

6. A leakage measurement apparatus for measuring a volume of leakage from an object to be measured, comprising:

a measurement base on which said object is mounted;

a pressure applying device for pressurizing a measurement medium and applying a predetermined leakage measurement pressure of said measurement medium to said object;

a volume metering device having a diaphragm, said volume metering device being in fluid communication with said object such that a leakage of said measurement medium from said object is transmitted to said diaphragm which is displaced in accordance with a change in a volume of said leakage, said volume metering device outputting a signal indicative of said displaced amount of said diaphragm; and a calculating unit for calculating a volume of said leakage based on said signal from said volume metering device; and further comprising a protection device disposed between said object and said volume metering device, for protecting said diaphragm by preventing said leakage of said measurement medium from transmitting to said diaphragm when a volume of said leakage of said measurement medium is equal to a predetermined value or more.

7. A leakage measurement apparatus according to claim 6, further comprising:

a stabilizer being in fluid communication with said volume metering device, for suppressing an influence of external disturbance on said diaphragm of said volume metering device.

8. A leakage measurement apparatus according to claim 6, wherein:

said protection device includes a protection film which is displaced in accordance with a volume of said leakage of measurement medium, and said protection film is prevented from being displaced by a predetermined amount or more.

9. A leakage measurement apparatus according to claim 8, wherein:

said protection device is disposed horizontally at an upper position than said object.

10. A leakage measurement apparatus according to claim 6, further comprising:

a pressure sensor for detecting a pressure of said measurement medium in a connection pipe between said object and said volume metering device.

11. A leakage measurement apparatus for measuring a volume of leakage from an object to be measured, comprising:

a measurement base on which said object is mounted;

a pressure applying device for pressurizing a measurement medium and applying a predetermined leakage measurement pressure of said measurement medium to said object;

a volume metering device having a diaphragm, said volume metering device being in fluid communication with said object such that a leakage of said measurement medium from said object is transmitted to said diaphragm which is displaced in accordance with a change in a volume of said leakage, said volume metering device outputting a signal indicative of said displaced amount of said diaphragm;

a calculating unit for calculating a volume of said leakage based on said signal from said volume metering device; and further comprising a stabilizer being in fluid communication with said volume metering device, for suppressing an influence of external disturbance on said diaphragm of said volume metering device, wherein, said stabilizer includes an airtightly sealed container having a volume which is sufficiently greater than a change in a volume, which is defined by said displaced amount of said diaphragm.

12. A leakage measurement apparatus for measuring a volume of leakage from an object to be measured, said apparatus comprising:

a measurement base on which said object is mounted;

a pressure applying device for pressurizing a measurement medium and applying a predetermined leakage measurement pressure of said measurement medium to said object;

a volume metering device having a diaphragm, said volume metering device being in fluid communication with said object such that a leakage of said measurement medium from said object is transmitted to said diaphragm which is displaced in accordance with a change in a volume of said leakage, said volume metering device outputting a signal indicative of said displaced amount of said diaphragm;

a second pressure applying device for applying a measurement medium having a predetermined checking pressure into a connection pipe between said object and said volume metering device through said object;

a closing valve for closing a communication between said second pressure applying device and said connection pipe; and a control device for calculating a volume of said leakage based on said signal from said volume metering device, and for monitoring a change in said signal of said volume metering device when said measurement medium having said predetermined checking pressure is applied into said connection pipe.

13. A leakage measurement apparatus according to claim 12, further comprising:

a volume changing device directly connected to said connection pipe between said object and said volume metering device for changing a volume of said measurement medium in said connection pipe.

14. A leakage measurement apparatus according to claim 13, further comprising:

an comparing unit for comparing said signal from said volume metering device and said change in said volume of said measurement medium in said connection pipe between said object and said volume metering device by said volume changing device.

15. A leakage measurement apparatus for measuring a volume of leakage from an object to be measured, comprising:

a measurement base on which said object is mounted;

a pressure applying device for pressurizing a measurement medium and applying a predetermined leakage measurement pressure of said measurement medium to said object;

a volume metering device having a diaphragm, said volume metering device being in fluid communication with said object such that a leakage of said measurement medium from said object is transmitted to said diaphragm which is displaced in accordance with a change in a volume of said leakage, said volume metering device outputting a signal indicative of said displaced amount of said diaphragm;

a calculating unit for calculating a volume of said leakage based on said signal from said volume metering device; and a pressure changing device for changing a pressure in said connection pipe between said object and said volume metering device, wherein, said pressure changing device includes a diaphragm which is harder than that of said volume metering device, and said pressure in said connection pipe between said object and said volume metering device is adjusted by displacing said diaphragm of said pressure changing device.

16. A leakage measurement apparatus for measuring a volume of leakage from an object, comprising:

a measurement base on which said object is mounted;

a pressure applying device for applying a predetermined leakage measurement pressure of said measurement medium in said object;

a volume metering device having a diaphragm and communicating with said object through an connection pipe such that a leakage of said measurement medium from said object is transmitted to said diaphragm to displace said diaphragm in accordance with a change in volume of said measurement medium in said connection pipe caused by said leakage;

a volume changing device connected to said connection pipe for changing a volume of said measurement medium in said connection pipe to displace said diaphragm; and a control device for calculating an amount of said change in volume of said measurement medium in said connection pipe based on a displaced amount of said diaphragm of said volume metering device, wherein said volume changing device changes said volume of said measurement medium in said connection pipe by a specific amount when there is no leakage of said measurement medium from said object, said specific amount being compared with said amount of said change in volume calculated by said control device.

* * * * *